United States Patent
Boufarguine

(10) Patent No.: US 10,070,121 B2
(45) Date of Patent: Sep. 4, 2018

(54) METHOD FOR CALIBRATING A DEPTH CAMERA

(71) Applicant: DASSAULT SYSTEMES, Velizy Villacoublay (FR)

(72) Inventor: Mourad Boufarguine, Paris (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 240 days.

(21) Appl. No.: 14/982,591

(22) Filed: Dec. 29, 2015

(65) Prior Publication Data

US 2016/0189358 A1 Jun. 30, 2016

(30) Foreign Application Priority Data

Dec. 29, 2014 (EP) .................................. 14307197

(51) Int. Cl.
*G06T 7/00* (2017.01)
*H04N 13/327* (2018.01)
(Continued)

(52) U.S. Cl.
CPC ........... *H04N 13/327* (2018.05); *G06T 7/593* (2017.01); *G06T 7/80* (2017.01); *G06T 7/85* (2017.01);
(Continued)

(58) Field of Classification Search
CPC . G06T 7/85; G06T 2207/10028; G06T 7/593; G06T 15/20; G06T 2200/04; G06T 2207/10012
See application file for complete search history.

(56) References Cited

U.S. PATENT DOCUMENTS

2002/0015048 A1* 2/2002 Nister ..................... G06T 15/20
345/625
2010/0020178 A1* 1/2010 Kleihorst .................. G06T 7/85
348/175

(Continued)

OTHER PUBLICATIONS

European Search Report (with Written Opinion) dated Jun. 26, 2015 in European Application 14307197.5 filed on Dec. 29, 2014.
(Continued)

*Primary Examiner* — Jaehwan Oh
(74) *Attorney, Agent, or Firm* — Oblon, McClelland, Maier & Neustadt, L.L.P.

(57) ABSTRACT

A method for calibrating a depth camera comprising the steps of:
S1) using a depth camera (DC) to be calibrated for acquiring a plurality of depth maps (DMS) of a physical three-dimensional reference object (PO), corresponding to different positions of the depth camera relative to the is reference object;
S2) computing a three-dimensional reconstruction ($3DR_i$) of the reference object from said depth maps, depending on values assigned to a set of calibration parameters ($SCP_i$) of the depth camera;
S3) computing an error ($ERR_i$) between the three-dimensional reconstruction computed at step S2) and a predetermined digital model (RM) of the reference object;
said steps S2) and S3) being iterated by assigning different values to said set of calibration parameters of the depth camera; and
S4) choosing values (SCP) of said set of calibration parameters which minimize the error computed at step S3);
said steps S2) to S4) being performed by a computer.

11 Claims, 2 Drawing Sheets

(51) Int. Cl.
*H04N 13/00* (2018.01)
*H04N 13/02* (2006.01)
*H04N 13/04* (2006.01)
*H04N 13/128* (2018.01)
*H04N 13/271* (2018.01)
*G06T 7/80* (2017.01)
*G06T 7/593* (2017.01)

(52) U.S. Cl.
CPC ..... *H04N 13/0022* (2013.01); *H04N 13/0271* (2013.01); *H04N 13/0425* (2013.01); *H04N 13/128* (2018.05); *H04N 13/271* (2018.05); *G06T 2207/10028* (2013.01); *H04N 2013/0081* (2013.01)

(56) References Cited

U.S. PATENT DOCUMENTS

| | | | |
|---|---|---|---|
| 2012/0105585 A1* | 5/2012 | Masalkar | H04N 13/0022 348/46 |
| 2012/0194644 A1* | 8/2012 | Newcombe | G06T 7/20 348/46 |
| 2012/0196679 A1* | 8/2012 | Newcombe | A63F 13/06 463/36 |
| 2013/0301908 A1* | 11/2013 | Shim | G06T 5/005 382/154 |
| 2014/0012415 A1* | 1/2014 | Benaim | G06K 9/00355 700/248 |
| 2014/0160123 A1* | 6/2014 | Yang | G06T 17/00 345/420 |
| 2014/0168367 A1* | 6/2014 | Kang | G06T 7/002 348/46 |
| 2014/0307058 A1* | 10/2014 | Kirk | H04N 5/33 348/47 |
| 2015/0169638 A1* | 6/2015 | Jaber | G06F 17/30259 707/749 |
| 2015/0178988 A1* | 6/2015 | Montserrat Mora | G06T 13/40 345/420 |
| 2016/0094840 A1* | 3/2016 | Warner | H04N 17/002 348/188 |

OTHER PUBLICATIONS

Popo Gui, et al., "Accurately Calibrate Kinect Sensor Using Indoor Control Field", Third International Workshop on Earth Observation and Remote Sensing Applications, IEEE, 2014, 5 pgs.

Koichiro Yamauchi, et al., "3D Reconstruction of a Human Body from Multiple Viewpoints", Advances in Image and Video Technology, 2007, 10 pgs.

Richard A. Newcombe, et al., "KinectFusion: Real-Time Dense Surface Mapping and Tracking", IEEE International Symposium on Mixed and Augmented Reality, 2011, 10 pgs.

Kai Berger, et al., "Markerless Motion Capture using multiple Color-Depth Sensors", Vision, Modeling, and Visualization, 2011, 8 pgs.

* cited by examiner

METHOD FOR CALIBRATING A DEPTH CAMERA

FIELD OF THE INVENTION

The invention relates to a computer-implemented method for calibrating a depth camera.

The invention belongs to the technical field of three-dimensional (3D) reconstruction, which consists in building digital models of physical three-dimensional objects from data acquired by sensors such as conventional cameras and/or depth cameras. 3D reconstruction lends itself to applications such as computer vision, computer graphics and augmented reality.

More precisely, the invention relates to the calibration—and more particularly to the "intrinsic" calibration—of depth cameras.

BACKGROUND OF THE INVENTION

Depth cameras (also known as "range cameras") are devices which produce two-dimensional (2D) images—known as "depth maps"—showing the distance of points in a scene from a specific point of the depth camera. Several different technologies can be used to implement depth cameras; among the most widely used one might mention time-of-flight cameras, based on a principle similar to radar, and structured light cameras, which project an infrared pattern onto the scene, acquire an image thereof and deduce depth information using image processing. Depth cameras can be combined with conventional color (RGB—Red, Green and Blue) cameras to produce two-dimensional images containing both color and depth information, which can be referred to as "RGB-Depth", or simply "RGBD" images. Combining a depth camera with a black-and-white camera is also possible, albeit less useful.

As illustrated on FIG. 1, a depth camera DC can be used to acquire multiple depth maps DM1, DM2, DM3 ("pure" depth maps or RGBD images) of a "physical" three-dimensional object PO from different positions. A reconstruction algorithm RA, executed by a computer, produces a three-dimensional reconstruction 3DR of the physical object taking the depth maps as inputs. Several suitable reconstruction algorithms are known in the art, see e.g. R. A. Newcombe et al. "KinectFusion: Real-Time Dense Surface Mapping and Tracking", Symposium ISMAR 2011.

The reconstruction algorithm does not necessarily need to receive, at its inputs, the positions and orientations ("poses") taken by the depth cameras to acquire the different depth maps, because this information—also called "extrinsic" calibration—can be deduced using the depth maps themselves. On the contrary, "intrinsic" calibration parameters of the depth camera—such as its focal length(s), principal point and possibly distortion parameters—do have to be provided to the reconstruction algorithm. The importance of the intrinsic calibration parameters is highlighted by FIG. 2, which shows different reconstructions of two three-dimensional objects—a figurine representing a rabbit on the top line, a cube on the bottom line—obtained by providing to the reconstruction algorithm different values of the focal length of the depth camera used to acquire the depth maps used as inputs. On both lines, the central image (in a frame) corresponds to the correct values of the focal length; images to the left and to the right correspond to increasingly incorrect values of this parameter. It can be seen that an incorrect calibration of the depth camera can lead to a completely meaningless reconstruction.

In some cases, calibration parameters provided by the manufacturer of a depth camera can be used for 3D reconstruction (this is the case of the above-referenced paper by R. A. Newcombe et al.), but if more accurate results are required, a dedicated calibration step has to be carried out. The problem of calibrating a depth (or a RGB-Depth) camera has been addressed e.g. in the following documents:

Herrera C., D., Kannala, J., Heikkilä, J., "Joint depth and color camera calibration with distortion correction", TPAMI, 2012;

R. Y. Tsai, "An Efficient and Accurate Camera Calibration Technique for 3D Machine Vision", Proceedings of IEEE Conference on Computer Vision and Pattern Recognition, Miami Beach, Fla., pp. 364-374, 1986;

Zhang, Zhengyou "Flexible Camera Calibration By Viewing a Plane From Unknown Orientations", ICCV, 1999.

The first of these documents concerns specifically the case of a RGB-Depth camera, but can also be applied to other kinds of depth camera which also provides an intensity image of the scene; the other two concern the calibration of conventional cameras allowing no depth measurements, but their teaching also applies to RGB-Depth cameras, and to depth cameras acquiring a grayscale image of the scene over which an infrared pattern has been projected.

These approaches use a planar pattern of known 2D geometry, such as a chessboard with known distance between corners, several images of which are acquired using the RGB or RGB-Depth camera to be calibrated. These images allow estimating a projection matrix of the camera, from which calibration parameters are extracted.

These approaches are more robust than the use of constructor datasheets, but there is no guarantee that they provide calibration parameters sufficiently accurate for 3D reconstruction; for instance, an error on focal lengths can be compensated by a drift on extrinsic parameters, i.e. parameters expressing the position and orientation of the camera. Moreover, the obtained parameters are extremely dependent on the protocol used for image acquisition.

The paper by Popo Gui et al. "Accurately Calibrate Kinect Sensor Using Indoor Control Field" discloses a method of calibrating a depth camera by imaging a control field comprising a number of control points of known position. This method only applies to certain kinds of depth camera, and the control points have to be materialized by markers, which may be impractical.

SUMMARY OF THE INVENTION

The invention aims at overcoming the drawbacks of the prior art mentioned above, and more specifically at providing a calibration method for a depth camera which is better suited for 3D reconstruction.

An object of the present invention is a method for calibrating a depth camera comprising the steps of:

S1) using a depth camera to be calibrated for acquiring a plurality of depth maps of a physical three-dimensional reference object, corresponding to different positions of the depth camera relative to the reference object;

S2) computing a three-dimensional reconstruction of the reference object from said depth maps, depending on values assigned to a set of calibration parameters of the depth camera;

S3) computing an error between the three-dimensional reconstruction computed at step S2) and a predetermined digital model of the reference object;

said steps S2) and S3) being iterated by assigning different values to said set of calibration parameters of the depth camera; and S4) choosing values of said set of calibration parameters which minimize the error computed at step S3);

said steps S2) to S4) being performed by a computer.

According to different embodiments of such a method:

Said steps S2) and S3) may be iterated a predetermined number of times by assigning respective predetermined values to said set of calibration parameters of the depth camera, said predetermined values sampling a parameter space.

Alternatively, said steps S2) and S3) may be iterated until the error computed at step S3) becomes lower, or lower of equal, to a predetermined threshold.

Said set of calibration parameters may comprise at least a focal length and two coordinates of a principal point of the depth camera. Said set of calibration parameters may also comprise at least one distortion parameter.

Said step S2) may comprise jointly determining the position of the depth camera, relative to a reference position, corresponding to each of said depth maps, and fusing said depth maps into a single three-dimensional signed and truncated distance field; and extracting an isosurface of said distance field into a three-dimensional mesh constituting said reconstruction of the reference object.

Said step S3) may comprise registering the three-dimensional reconstruction computed at step S2) and said predetermined digital model of the reference object prior to computing said error.

Said step S3) may comprise computing an exact or approximate Hausdorff distance or symmetrical Hausdorff distance between the three-dimensional reconstruction computed at step S2) and said predetermined digital model of the reference object.

Another object of the invention is a computer program product, stored on a computer-readable data-storage medium, comprising computer-executable instructions to cause a computer system to carry out steps S2) to S4) of such a method.

Another object of the invention is a computer-readable data-storage medium containing computer-executable instructions to cause a computer system to carry out steps S2) to S4) of such a method.

Another object of the invention is a computer system comprising a processor coupled to a memory and a graphical user interface, the memory storing computer-executable instructions to cause the computer system to carry out steps S2) to S4) of such a method.

"Depth camera" designates any device producing images containing depth information.

"Depth map" designates any image containing depth information such as a "pure" depth map (only containing depth information) or a RGBD one.

"Calibration parameters" of a depth camera will be used specifically to designate "intrinsic" parameters, i.e. all the optical, mechanical, electronics etc. parameter of the depth camera having an influence on the way a scene is converted to an image containing depth information. Calibration parameters usually include:

In optics, the "physical" focal length F is the distance at which initially collimated rays are brought to a focus by a lens. When modeling cameras, however, focal length "f" is most often defined as the product of the physical focal length F of the lens (measured in mm) and the pixel density of the imaging sensor (pixels/mm), and is therefore measured in pixels. If the pixels are rectangular, there are two different values of pixel density along the x and y directions: sx and sy. As a consequence, two focal length are defined: fx=sx·F and fy=sy·F. Only fx and fy can be derived without actually dismantling the camera and measuring its components directly.

Coordinates of the principal point in the image plane. The principal point is defined by the intersection of the optical axis of the camera with its image plane.

Distortion parameters express radial and/or tangential distortion of the camera lens. Usually, they are the parameters of a polynomial function linking undistorted and distorted image points.

A depth camera can be characterized by a set of calibration parameters, which form a vector, or point of a suitable "parameter space", and a pose—i.e. its position and orientation. The parameters expressing the pose are also called "extrinsic parameters".

A physical object (i.e. an object existing in the physical world) can be considered "three-dimensional" if its smallest dimension is greater or equal than one-hundredth, and preferably one-tenth, of its greatest dimension.

A "digital model" of a physical object is a representation of such an object (or simply of its outer surface) in a computer memory, in the form of a file, plurality of files or data structure. For instance, a digital model can represent an object as a grid corresponding to its outer surface, or as a point cloud. A "3D digital model" is a digital model preserving the three-dimensional spatial structure of the object;

"Reconstruction" refers to the process of building a digital model of an object from depth maps thereof, and also to the digital model obtained by this process.

A "distance field" is a particular data structure in a computer memory, representing a portion of the physical space containing a physical object. This portion of physical space is represented by a finite "reconstruction space", discretized in voxels ("voxelized"). A numerical value is attributed to each voxel, said value expressing the distance (typically, a signed and truncated distance) between the voxel and a surface of the physical object. An "isosurface" of the reconstruction space is a surface defined by voxels of a same value.

"Registering" is the operation of determining the rigid transformation (rotation-translation) which links, exactly or at least approximately, two digital models of a physical object.

BRIEF DESCRIPTION OF THE DRAWINGS

Additional features and advantages of the present invention will become apparent from the subsequent description, taken in conjunction with the accompanying drawings, wherein.

DETAILED DESCRIPTION

Figure 1:
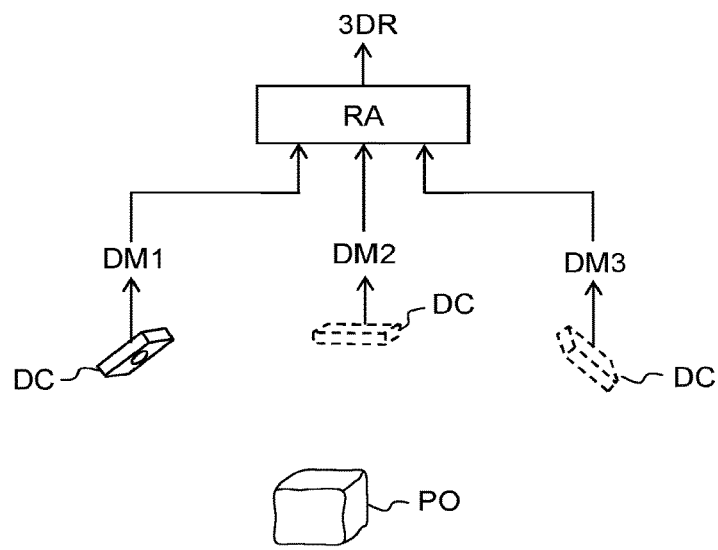
FIG. 1, described above, is a schematic representation of the process of performing three-dimensional reconstruction of a physical object using a depth camera.
Figure 2:
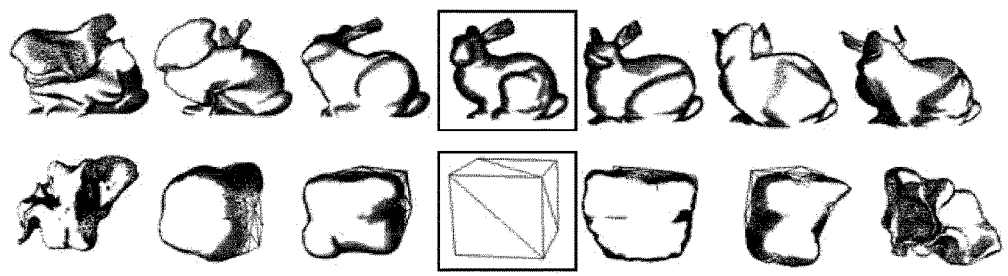
FIG. 2, described above, illustrates the importance of calibration of the depth camera for three-dimensional reconstruction.
Figure 3:
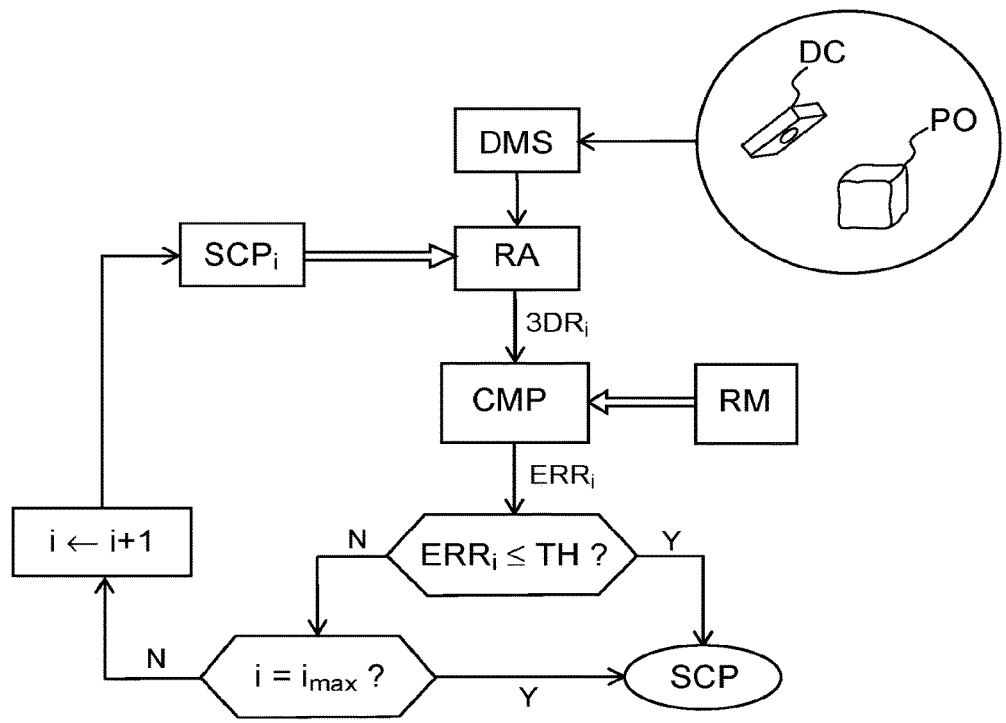
FIG. 3 is a flow-chart of a calibration method according to an embodiment of the invention.

As illustrated on the flow chart of FIG. 3, the depth camera DC to be calibrated is used to take a set DMS of depth maps of a reference three-dimensional physical object PO, an accurate three-dimensional digital model RM of which (reference model) is available.

Then, three-dimensional reconstruction of the reference object is performed by applying a suitable reconstruction algorithm RA to the depth maps. The reconstruction algorithm requires a set of calibration parameters of the depth camera—focal length(s), principal point, possibly also distortion parameters—which are unknown, and whose determination is the aim of the inventive method. To this aim, a sampling of a parameter space is performed, which provides a finite number of sets—or vectors—of parameters, $SCP_i$, each characterized by a particular value of each calibration parameter. For example, if astigmatism and distortion are ignored, the depth camera is characterized by three intrinsic calibration parameters: its focal length f and the coordinates $u_0$, $v_0$ of its principal point. N parameter vectors $SCP_i = [f_i, u_{0,i}, V_{0,i}]$—with $f_i \in [f_{min}, f_{max}]$, $u_{0,i} \in [u_{0,min}, u_{0,max}]$, $V_{0,i} \in [V_{0,min}, V_{0,max}]$, $i \in [1, N]$—are obtained by sampling the three-dimensional parameter space.

A first sample of the parameter space $SCP_1$ is chosen for performing the first reconstruction of the reference object. Other samples are used during successive iterations of the inventive method.

Several reconstruction algorithms are known from the prior art and may be used to implement the inventive method, such as the one described in the above-reference paper by R. A. Newcombe et al. "KinectFusion: Real-Time Dense Surface Mapping and Tracking", Symposium ISMAR 2011, which is incorporated by reference. See also Richard Szeliski "*Computer Vision: Algorithms and Applications*". Springer, New York, 2010.

This method uses a truncated signed distance field for iteratively fusing a plurality of depth maps into a unified representation of a scene including the reference object. As mentioned above, the distance field is obtained by defining a finite reconstruction volume, voxelizing it, and assigning to each voxel a signed and truncated distance d(x,y,z) from the 3D surface of the reference object, x,y,z being the coordinates of the reconstruction volume. The fact that the distance is signed allows differentiating the inside from the outside of the reference object. Each voxel is also characterized by a weight w which balances the relative importance of the information given by a current depth map for this voxel compared to all the other depth maps of the set DMS. It is worth noting that d(x,y,z) also defines an implicit function, i.e. the surface represented by the distance field is given by d(x,y,z)=0, and thus the normal to surface at (x,y,z) is given by the gradient of d at (x,y,z).

The reconstruction algorithm is carried out iteratively. A first depth map is arbitrary positioned relative to the distance field, and then fused into it according to the process described further.

To perform the n-th iteration, the position and orientation (i.e. the pose) of the depth camera when acquiring the (n−1)th depth map are supposed known. Before being able to fuse the n-th depth map into the depth field, it is necessary to estimate the pose of the camera corresponding to this image, i.e. the rotation and translation defining its position and orientation with respect to a reference frame. This is performed using the so-called point-to-plane iterative closest point algorithm.

According to this algorithm, ray-casting is used to compute an estimation (or "virtual view") of the current surface stored in the distance field—i.e. defined by d(x,y,z)=0—viewed from the (n−1)th position of the depth camera. The virtual view is less noisy than the real view from the (n−1)th pose; moreover using a virtual view instead of a real one avoids a drift of the pose.

A ray is traced from the position of the depth camera at time n−1, towards the reconstruction volume, passing through each pixel of this virtual view, and when it intersects the surface (i.e. when it goes from a voxel with positive distance to a next voxel with negative distance) an associated point is created at the surface d(x,y,z)=0. The normal to the surface at this point is determined by computing the gradient of the distance field at that point. Thus, a point cloud, called refPC, is obtained.

Each pixel of the current (n-th) depth map is then back-projected to create another point cloud, and the normal to the surface corresponding to each point of the cloud is also determined by computing the cross product between points corresponding to neighboring pixels. This point cloud is called currPC.

Then, registration between refPC and currPC is performed. First, the pose of the depth camera corresponding to the n-th depth map is initialized to coincide to the (n−1)th pose. Then, it is iteratively optimized until convergence is reached. Iterative optimization comprises the following steps:

For each point in the currPC point cloud, the closest point in the refPC point cloud is found. To do so, each point of currPC is projected onto the virtual view, using the current n-th estimated pose, in order to associate it to a point of refPC. Outliers are rejected by removing correspondences where the angle between the two normals (i.e. the normal to the point of refPC and the normal to the point of currPC) is greater than a threshold, or the distance between the two corresponding points is greater than a threshold The combination of rotation and translation that best aligns each source point to its match found in the previous step is estimated. The Gauss-Newton algorithm is used to minimize a mean squared distance cost function, based on a point-to-plane distance defined by the distance of each point from currPC to the plane defined by its correspondent point in refPC and the normal at that point. Robust M-estimators can also be used to improve convergence. This point-to-plane distance is also more robust to inaccurate correspondences than a point-to-point distance.

The source points (i.e. the points of refPC) are transformed using the obtained transformation.

The steps above are iterated until the cost function becomes lower than, or lower or equal to, a defined threshold, or a maximum number of iterations is performed.

Once the translation and orientation of the current depth map with respect to the frame of reference is known, said current depth map is fused into the distance field. To do so, the new information given by the current depth map is simply averaged with the previous information stored in each voxel of the distance field. Each voxel of the distance field is projected onto the depth map, and the distance of this voxel to the sensor is compared with the depth given by the depth map at the projection of the voxel. This gives the distance d' that should have the voxel according to the current depth map. Then averaging is performed (different schemes are possible):

$$d_n = (w'_n d'_n + w_{n-1} d_{n-1})/(w_{n-1} + w'_n)$$

$$w_n = \max(w_{n-1} + w'_n, M)$$

where the index "n" or "n−1" refer the number of the iteration, and therefore of the pose. The weight w can be initialized to 1 and then increases according to the second equation, while being limited to a preset maximum value M. The weight w' can either take a constant value (e.g. 1) or a value depending on d' (to account for the fact that precision often decreases with distance) or on the incidence angle of the ray connecting the centre of the camera with the voxel.

Finally, the isosurface d(x,y,z)=0 of the distance field is extracted into a discrete triangular mesh representation of this surface. This can be done using the well-known Marching Cubes algorithm which proceeds through the distance field, taking eight neighbor voxels at a time, then determining the polygon(s) needed to represent the part of the isosurface that passes through these eight voxels.

The three-dimensional reconstruction $3DR_i$ of the reference object obtained this way is then aligned (registered) with the reference model RM to be compared to it in order to validate the estimation of the intrinsic parameters. Registration and comparison proper are jointly represented, on FIG. 3, by block "CMP".

Classical methods for 3D model registration are based on a strong description of a reduced subset of points, leading to robust correspondences between points belonging to different point clouds. The pipeline of this kind of approach is divided in three stages:

The first stage consists in determining the subset of points that will be described. Those points must represent the most remarkable geometries of the point cloud, such as corners or edges. Therefore they are called "Keypoints" or "Points of Interest".

The second stage consists in describing those points. The description is often based on their neighborhood. In order to match the points representing the same geometry and differentiate those of different geometries, the description must be fully detailed.

Finally (third stage), the points having similar description are matched together. Those correspondences are not always right; in order to distinguish outliers (bad correspondences) from inliers (good correspondences), statistical methods, such as RANSAC (RANdom Sample Consensus) are often used. The final rigid transformation between the point clouds is worked out from the inliers. This approach is known from the paper by M. A. Fischler et al. "Random sample consensus: a paradigm for model fitting with applications to image analysis and automated cartography" Commun. ACM 24 (1981) 381 395, which is incorporated by reference.

Alternative approaches to solve the registration problem can also be applied to the present invention. An approach allowing real-time computation is described in the paper by B. Drost et al.: "Model Globally, Match Locally: Efficient and Robust 3D Object Recognition", IEEE Computer Society Conference on Computer Vision and Pattern Recognition (CVPR), San Francisco, Calif. (USA), June 2010, which is also incorporated by reference. This approach is based on a simple and fast method for point pairs feature descriptor computation. In consequence, many point pairs will have a similar description resulting in a huge number of correspondences. Therefore, many of them will be wrong. A voting scheme is then carried on to discern the inliers from the outliers.

Once the reconstructed model $3DR_i$ is registered to the reference model RM, a 3D-to-3D distance between the models is computed to estimate an error $ERR_i$ between them. The error can be e.g. a mean square distance or a (possibly symmetrical) Hausdorff distance. The Hausdorff distance between a first surface S1 and a second surface S2, $d_H(S1, S2)$ is given by:

$$d_H(S1, S2) = \max_{p \in S1} d(p, S2)$$

Where p is a point of S1 and $$d(p, S2) = \min_{p' \in S2} \|p - p'\|_2$$

Where p' is a point of S2 and $\| \|_2$ is the Euclidian norm.
In general, $d_H(S1,S2) \neq d_H(S2,S1)$; the symmetrical Hausdorff distance is then defined as $$d_H^S = \max[d_H(S1,S2), d_H(S2,S1)].$$

The paper by N. Aspert et al. "Measurement errors between surfaces using the Haussdorff distance", ICME 2002, which is incorporated by reference, describes an efficient algorithm for estimating an approximate Hausdorff distance between two surfaces.

The error $ERR_i$ is then compared to a fixed threshold TH. If it is lower than, or lower or equal to, this threshold, the iteration stops and $SCP_i$ gives the optimal calibration parameters of the depth camera. Otherwise, "i" is increased (i.e. different trial values for the calibration parameters are chosen) and a new iteration is performed. If all the samples of the parameter space have been used (i.e. "i" has attained its maximum value), then the set of parameters corresponding to the lowest error is chosen. Alternatively, comparison to a threshold can be omitted, and full exploration of the parameter space is performed in any case.

It can be easily understood that the calibration parameters found this way are optimal for 3D reconstruction.

The inventive method (or, more precisely, its data processing part, following the acquisition of the depth maps) can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 4:
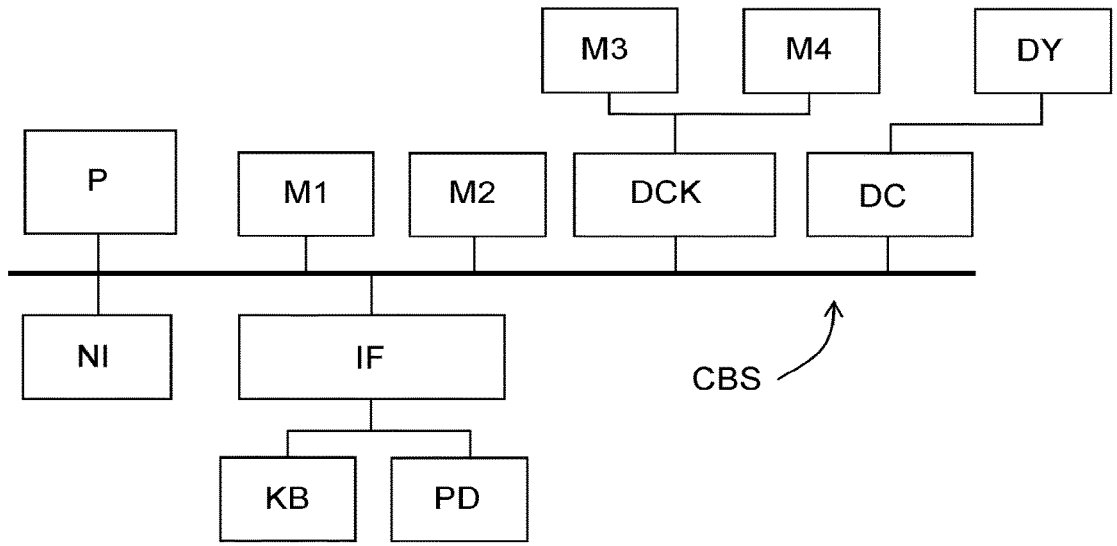
FIG. 4 is a block diagram of a computer system suitable for carrying out a method according to an embodiment of the invention.

A computer suitable for carrying out a method according to an exemplary embodiment of the present invention is described with reference to FIG. 4. In FIG. 4, the computer includes a Central Processing Unit (CPU) P which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. At least one digital model of a reference object is also stored on one or more of memory devices M1 to M4, or remotely.

The claimed invention is not limited by the form of the computer-readable media on which the computer-readable instructions and/or the digital model(s) of the inventive process are stored. For example, the instructions, the trial sets of calibration parameters and the digital model(s) can be stored on CDs, DVDs, in FLASH memory, RAM, ROM, PROM, EPROM, EEPROM, hard disk or any other information processing device with which the computer aided design station communicates, such as a server or computer.

The program, the trial sets of calibration parameters and the digital model(s) can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft VISTA, Microsoft Windows 7, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 4 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

The invention claimed is:

1. A method for calibrating a depth camera comprising:
S1) acquiring, using a depth camera to be calibrated, a plurality of depth maps of a physical three-dimensional reference object, corresponding to different positions of the depth camera relative to the physical three-dimensional reference object;
S2) computing a three-dimensional reconstruction of an outer surface of the reference object from said depth maps, depending on values assigned to a set of intrinsic calibration parameters of the depth camera;
S3) computing an error between the three-dimensional reconstruction computed at step S2) and a predetermined digital model of the outer surface of the reference object;
iterating said steps S2) and S3) by assigning different values to said set of intrinsic calibration parameters of the depth camera; and
S4) choosing values of said set of intrinsic calibration parameters which minimize the error computed at step S3), wherein
said steps S2) to S4) are performed by a computer.

2. The method of claim 1, wherein said steps S2) and S3) are iterated a predetermined number of times by assigning respective predetermined values to said set of intrinsic calibration parameters of the depth camera, said predetermined values sampling a parameter space.

3. The method of claim 1, wherein said steps S2) and S3) are iterated until the error computed at step S3) becomes lower, or lower of equal, to a predetermined threshold.

4. The method of claim 1, wherein said set of intrinsic calibration parameters comprises at least a focal length and two coordinates of a principal point of the depth camera.

5. The method of claim 4, wherein said set of intrinsic calibration parameters also comprises at least one distortion parameter.

6. The method of claim 1, wherein said step S2) comprises jointly determining the position of the depth camera, relative to a reference position, corresponding to each of said depth maps, and fusing said depth maps into a single three-dimensional signed and truncated distance field; and extracting an isosurface of said distance field into a three-dimensional mesh constituting said reconstruction of the reference object.

7. The method of claim 1, wherein said step S3) comprises registering the three-dimensional reconstruction computed at step S2) and said predetermined digital model of the reference object prior to computing said error.

8. The method of claim 1, wherein said step S3) comprises computing an exact or approximate Hausdorff distance or symmetrical Hausdorff distance between the three-dimensional reconstruction computed at step S2) and said predetermined digital model of the reference object.

9. A computer program product, stored on a non-transitory computer-readable data-storage medium, comprising computer-executable instructions to cause a computer system to:
compute a three-dimensional reconstruction of an outer surface of a physical three-dimensional reference object from a plurality of depth maps of said physical three-dimensional reference object, acquired using a depth camera to be calibrated and corresponding to different positions of the depth camera relative to the reference object;
compute an error between the computed three-dimensional reconstruction and a predetermined digital model of the outer surface of the reference object;
iterate the previous operations by assigning different values to a set of intrinsic calibration parameters of the depth camera; and
choose values of said set of intrinsic calibration parameters which minimize the computed error.

10. A non-transitory computer-readable data-storage medium containing computer-executable instructions to cause a computer system to:
compute a three-dimensional reconstruction of an outer surface of a physical three-dimensional reference object from a plurality of depth maps of said physical three-dimensional reference object, acquired using a depth camera to be calibrated and corresponding to different positions of the depth camera relative to the reference object;
compute an error between the computed three-dimensional reconstruction and a predetermined digital model of the outer surface of the reference object;
iterate the previous operations by assigning different values to a set of intrinsic calibration parameters of the depth camera; and
choose values of said set of intrinsic calibration parameters which minimize the computed error.

11. A computer system comprising:
a processor coupled to a memory and a graphical user interface, the memory storing computer-executable instructions to cause the processor to be configured to:
compute a three-dimensional reconstruction of an outer surface of a physical three-dimensional reference object from a plurality of depth maps of said physical three-dimensional reference object, acquired using a depth camera to be calibrated and corresponding to different positions of the depth camera relative to the reference object;
compute an error between the computed three-dimensional reconstruction and a predetermined digital model of the outer surface of the reference object;
iterate the previous operations by assigning different values to a set of intrinsic calibration parameters of the depth camera; and
choose values of said set of intrinsic calibration parameters which minimize the computed error.

* * * * *